United States Patent
Haugen et al.

(10) Patent No.: US 9,385,981 B2
(45) Date of Patent: Jul. 5, 2016

(54) SYSTEM AND METHOD FOR PROVIDING MULTI-MODAL ASYNCHRONOUS COMMUNICATION

(75) Inventors: Frances Bordwell Haugen, Mountain View, CA (US); Gregory Matthew Marra, San Francisco, CA (US)

(73) Assignee: Google Inc., Mountain View, CA (US)

(*) Notice: Subject to any disclaimer, the term of this patent is extended or adjusted under 35 U.S.C. 154(b) by 520 days.

(21) Appl. No.: 13/556,149

(22) Filed: Jul. 23, 2012

(65) Prior Publication Data
US 2014/0025757 A1   Jan. 23, 2014

(51) Int. Cl.
| | |
|---|---|
| G06F 15/16 | (2006.01) |
| G06F 13/36 | (2006.01) |
| H04W 36/00 | (2009.01) |
| H04L 12/58 | (2006.01) |
| H04W 84/04 | (2009.01) |
| H04M 7/00 | (2006.01) |
| G10L 15/26 | (2006.01) |
| H04L 29/06 | (2006.01) |
| H04L 12/18 | (2006.01) |

(52) U.S. Cl.
CPC .................. H04L 51/10 (2013.01); G10L 15/26 (2013.01); H04L 12/1822 (2013.01); H04L 65/1016 (2013.01); H04M 7/0048 (2013.01); H04W 84/045 (2013.01)

(58) Field of Classification Search
CPC . H04L 12/5835; H04L 12/589; H04L 51/066; H04L 51/36; H04L 65/1016; H04W 84/045; G10L 15/26; H04M 7/0048
USPC .......................................................... 709/206
See application file for complete search history.

(56) References Cited

U.S. PATENT DOCUMENTS

| | | | |
|---|---|---|---|
| 6,912,581 B2 | 6/2005 | Johnson et al. | |
| 7,822,191 B2* | 10/2010 | McKinzie et al. | ....... 379/355.07 |
| 2003/0028380 A1* | 2/2003 | Freeland et al. | .............. 704/260 |
| 2004/0225753 A1* | 11/2004 | Marriott et al. | ............... 709/246 |
| 2007/0060367 A1* | 3/2007 | Heler | .............................. 463/42 |
| 2007/0083656 A1 | 4/2007 | Bobo, II | |
| 2009/0034700 A1 | 2/2009 | Brunson et al. | |
| 2009/0061825 A1 | 3/2009 | Neelakantan et al. | |

(Continued)

OTHER PUBLICATIONS

International Search Report and Written Opinion for International Application No. PCT/US2013/051566 mailed Feb. 7, 2014. 9 pages.

*Primary Examiner* — Arvin Eskandarnia
*Assistant Examiner* — Margishi Desai (57) ABSTRACT

Embodiments include receiving a first synchronous communication message in a first modality from a first user device. The method may further include generating a first asynchronous communication message in a second modality, based at least in part on the first synchronous communication message in the first modality, wherein the first modality differs from the second modality. The method may also include receiving a second asynchronous communication message in the second modality from a second user device. The method may further include generating a second asynchronous communication message in the first modality based at least in part on the second synchronous communication message in the second modality. The method may also include providing for display to the first user device, the second asynchronous message in the first modality. The method may further include providing for display to the second user device, the first asynchronous message in the second modality.

24 Claims, 5 Drawing Sheets

(56) References Cited

U.S. PATENT DOCUMENTS

| | | |
|---|---|---|
| 2009/0063995 A1* | 3/2009 | Baron et al. ................. 715/753 |
| 2009/0319918 A1 | 12/2009 | Affronti et al. |
| 2011/0276898 A1 | 11/2011 | van der Fiier et al. |
| 2011/0276901 A1* | 11/2011 | Zambetti et al. .............. 715/753 |
| 2011/0276903 A1* | 11/2011 | Mehin et al. .................. 715/758 |
| 2011/0276904 A1 | 11/2011 | Mehin et al. |
| 2012/0237009 A1 | 9/2012 | Szpilfogel |

* cited by examiner

SYSTEM AND METHOD FOR PROVIDING MULTI-MODAL ASYNCHRONOUS COMMUNICATION

TECHNICAL FIELD

This disclosure relates to communication techniques and, more particularly, to a method of providing communication between different communication modality types.

BACKGROUND

People are not always available at the same place or same time. Modes of communication exist that enable synchronous or asynchronous communication. Generally asynchronous modes are text based while synchronous modes are text, voice or video based. No tool exists for enabling a communication session that works seamlessly with video, speech, and text.

SUMMARY OF DISCLOSURE

In one implementation, a method, in accordance with this disclosure, may include receiving, using one or more computing devices, a first synchronous communication message in a first modality from a first user device. The method may further include generating, using the one or more computing devices, a first asynchronous communication message in a second modality, based at least in part on the first synchronous communication message in the first modality, wherein the first modality differs from the second modality. The method may also include receiving, using the using one or more computing devices, a second asynchronous communication message in the second modality from a second user device. The method may further include generating, using the one or more computing devices, a second synchronous communication message in the first modality based at least in part on the second asynchronous communication message in the second modality. The method may also include providing for display, using the one or more computing devices, to the first user device, the second synchronous message in the first modality. The method may further include providing for display, using the one or more computing devices, to the second user device, the first asynchronous message in the second modality.

One or more of the following features may be included. In some embodiments, the first user device and the second user device are coupled to an electronic communication session. The first modality may be text-based and the second modality may be video-based. The method may further include receiving, at the one or more computing devices, at least one of a second synchronous communication message and a second asynchronous communication message. The method may also include transmitting, at the computing device, instructions configured to generate a display of at least one of synchronous communication message, the asynchronous communication message, the second synchronous communication message and the second asynchronous communication message. The method may further include converting, at the computing device, the received asynchronous communication message to an audio message. The method may also include transmitting, at the computing device, one or more instructions configured to output the audio message at the electronic communication session. The method may also include converting, at the computing device, at least one of a voice-based synchronous communication message and an audio-based synchronous communication message to a text-based message. In some embodiments, the text-based message may be included within a display. The method may also include storing at least one of the synchronous communication message and the asynchronous communication message. The method may also include transmitting, at the computing device, one or more instructions configured to display a static avatar corresponding to at least one participant of the electronic communication session. In some embodiments, the electronic communication session may be at least one of a web-based session configured to allow video-chat and a text messaging session.

In another implementation, a computer program product residing on a computer readable storage medium having a plurality of instructions stored thereon is provided. In some embodiments, the instructions, which when executed by a processor, cause the processor to perform one or more operations. Some operations may include receiving, using one or more computing devices, a first synchronous communication message in a first modality from a first user device. Operations may further include generating, using the one or more computing devices, a first asynchronous communication message in a second modality, based at least in part on the first synchronous communication message in the first modality, wherein the first modality differs from the second modality. Operations may also include receiving, using the using one or more computing devices, a second asynchronous communication message in the second modality from a second user device. Operations may further include generating, using the one or more computing devices, a second synchronous communication message in the first modality based at least in part on the second asynchronous communication message in the second modality. Operations may also include providing for display, using the one or more computing devices, to the first user device, the second synchronous message in the first modality. Operations may further include providing for display, using the one or more computing devices, to the second user device, the first asynchronous message in the second modality.

One or more of the following features may be included. In some embodiments, the first user device and the second user device are coupled to an electronic communication session. The first modality may be text-based and the second modality may be video-based. Operations may further include receiving, at the one or more computing devices, at least one of a second synchronous communication message and a second asynchronous communication message. Operations may also include transmitting, at the computing device, instructions configured to generate a display of at least one of synchronous communication message, the asynchronous communication message, the second synchronous communication message and the second asynchronous communication message.

In another implementation, a computing system is provided. In some embodiments, the computing system may include one or more processors configured to receive a first synchronous communication message in a first modality from a first user device. The one or more processors may be further configured to generate a first asynchronous communication message in a second modality, based at least in part on the first synchronous communication message in the first modality, wherein the first modality differs from the second modality. The one or more processors may be further configured to receive a second asynchronous communication message in the second modality from a second user device. The one or more processors may be further configured to generate a second synchronous communication message in the first modality based at least in part on the second asynchronous communication message in the second modality. The one or more processors may be further configured to provide for display to the first user device, the second synchronous message in the first modality. The one or more processors may be further configured to provide for display to the second user device, the first asynchronous message in the second modality.

One or more of the following features may be included. In some embodiments, the one or more processors may be further configured to convert the received asynchronous communication message to an audio message. The one or more processors may be further configured to transmit one or more instructions configured to output the audio message at the electronic communication session. The one or more processors may be further configured to convert at least one of a voice-based synchronous communication message and an audio-based synchronous communication message to a text-based message. In some embodiments, the text-based message may be included within a display. The one or more processors may be further configured to store at least one of the synchronous communication message and the asynchronous communication message.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION OF THE EMBODIMENTS

Overview

Today, certain communication sessions such as huddles may function by retaining state between two or more people in a text conversation. People may engage with each other in real-time and the huddle may function much like chat. In some cases, they may engage with each other asynchronously, and the huddle may function like internet relay chat ("IRC"). Some approaches (e.g. Google+ Hangouts) may be used to allow users to simultaneously video chat with others (or just voice chat if they don't have cameras) while text and/or voice chatting in parallel.

Embodiments described herein may combine the concept of the huddle and the hangout to create a single communications forum by which people can engage with each other using text, voice, and/or video both synchronously or asynchronously. For example, imagine a huddle that contains two people engaging with the communications forum via text on a mobile device, one who is dialed in with only a voice connection (e.g. while they drive their car), and two that are video chatting.

In this particular example, for the people engaging with the communications forum by text, they may see transcriptions of everything the speech people and the video people are saying using voice recognition. The people who are using video-chat may see static avatars of the people who are engaging by text or by voice. If a text user sends a message to the communications forum, their text may be turned into speech using text-to-speech techniques known in the art.

For all of these participants, a record may now exist of the history of the huddle, both the spoken and typed portions of it. Thus, if someone was busy when people were hanging out, they can catch up on what they missed and then jump back in.

Embodiments of the present disclosure may allow users to participate in the forum even though they may have missed portions of the discussion. For example, if no one was "live"—a participating user could just read the backlog and post an update in an IRC like fashion. Additionally and/or alternatively, imagine if two or more communications forum participants were driving to work, they could talk to each other as they commuted. Further, if a participant joined the communications forum via video once they got to work, embodiments described herein would address this scenario as well.

Accordingly, embodiments described herein may allow for the participants of the communications forum to save audio-recordings, video-recordings, transcriptions, etc. for future use. Additionally and/or alternatively, embodiments of the present disclosure may be used with a television with one or more processors embedded therein or coupled thereto and/or other devices (e.g. in a tablet like wall device, which may be used for ambient presence).

Example Systems:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIGS. 1-5, there is shown a communication process 10 that may reside on and may be executed by computer 12, which may be connected to network 14 (e.g., the Internet or a local area network). Server application may include some or all of the elements of communication process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, or a computing cloud. The various components of computer 12 may execute one or more operating systems, examples of which may include but are not limited to: Microsoft Windows Server™; Novell Netware™; Redhat Linux™, Unix, or a custom operating system, for example.

Figure 2:
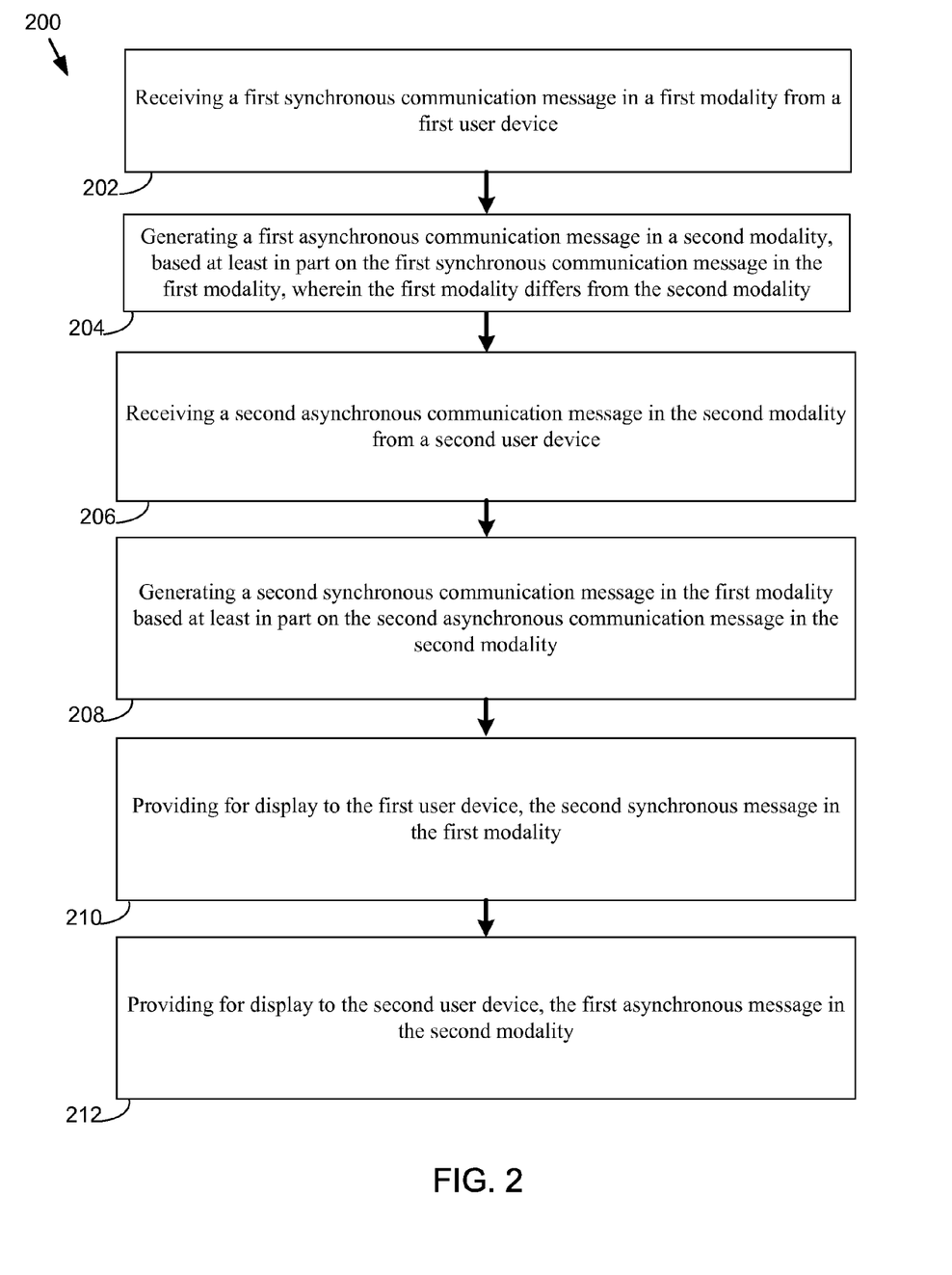
FIG. 2 is a flowchart of the method for providing multi-modal asynchronous communication of FIG. 1 in accordance with an embodiment of the present disclosure.

As will be discussed below in greater detail, communication process 10 may include receiving (202), using one or more computing devices, a first synchronous communication message in a first modality from a first user device. The method may further include generating (204), using the one or more computing devices, a first asynchronous communication message in a second modality, based at least in part on the first synchronous communication message in the first modality, wherein the first modality differs from the second modality. The method may also include receiving (206), using the using one or more computing devices, a second asynchronous communication message in the second modality from a second user device. The method may further include generating (208), using the one or more computing devices, a second synchronous communication message in the first modality based at least in part on the second asynchronous communication message in the second modality. The method may also include providing (210) for display, using the one or more computing devices, to the first user device, the second synchronous message in the first modality. The method may further include providing (212) for display, using the one or more computing devices, to the second user device, the first asynchronous message in the second modality.

Figure 1:
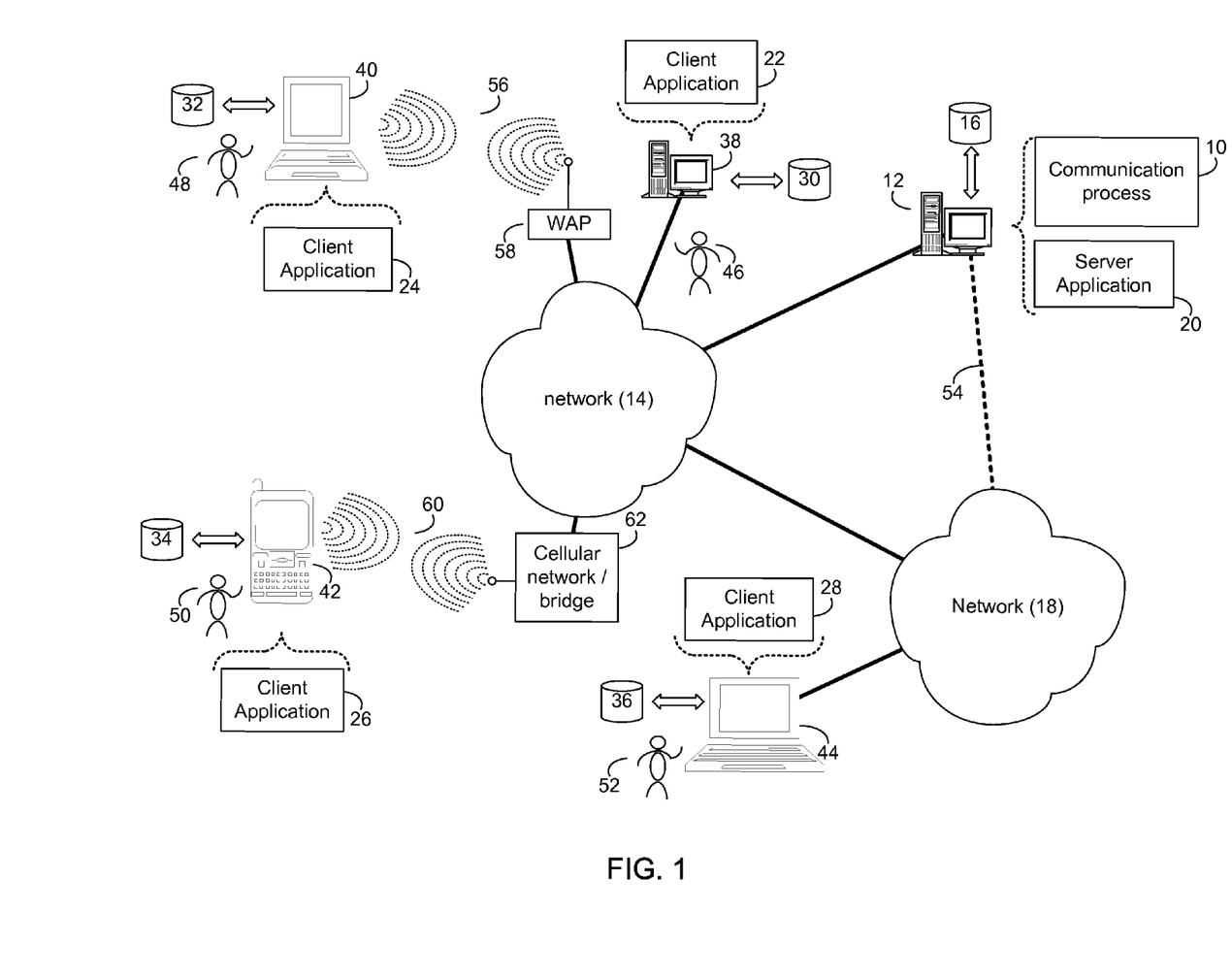
FIG. 1 is a diagrammatic view of a method for providing multi-modal asynchronous communication in accordance with an embodiment of the present disclosure.

The instruction sets and subroutines of communication process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Communication process 10 may be accessed via client applications 22, 24, 26, 28. Examples of client applications 22, 24, 26, 28 may include but are not limited to a standard web browser, a customized web browser, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a server (not shown), a data-enabled, cellular telephone (not shown), a television with one or more processors embedded therein or coupled thereto (not shown), and a dedicated network device (not shown).

One or more of client applications 22, 24, 26, 28 may be configured to effectuate some or all of the functionality of communication process 10. Accordingly, communication process 10 may be a purely server-side application, a purely client-side application, or a hybrid server-side/client-side application that is cooperatively executed by one or more of client applications 22, 24, 26, 28 and communication process 10.

Users 46, 48, 50, 52 may access computer 12 and communication process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, or a custom operating system.

A number of users 46, 48, 50, and 52 of the client devices 38, 40, 42, 44, respectively, may access the server device 12 to participate in a social networking service. For example, the client devices 38, 40, 42, 44 can execute web browser applications that can be used to access the social networking service. In another example, the client devices 38, 40, 42, 44 may execute software applications that are specific to the social network (e.g., social networking "apps" running on smart-phones).

The users 46, 48, 50, and 52 may participate in the social networking service provided by server device 12 by posting information, such as text comments (e.g., updates, announcements, replies), digital photos, videos, or other appropriate electronic information. In some implementations, information can be posted on a user's behalf by systems and/or services external to the social network or the server device 12. For example, the user 46 may post a review of a movie to a movie review website, and with proper permissions that website may cross-post the review to the social network on the user's 46 behalf. In another example, a software application executing on a mobile device, with proper permissions, may use global positioning system (GPS) capabilities to determine the user's location and automatically update the social network with his location (e.g., "At Home", "At Work", etc.).

Example Communication Processes:

As discussed above and referring also to FIGS. 1-5, communication process 10 may include receiving (202), using one or more computing devices, a first synchronous communication message in a first modality from a first user device. The method may further include generating (204), using the one or more computing devices, a first asynchronous communication message in a second modality, based at least in part on the first synchronous communication message in the first modality, wherein the first modality differs from the second modality. The method may also include receiving (206), using the using one or more computing devices, a second asynchronous communication message in the second modality from a second user device. The method may further include generating (208), using the one or more computing devices, a second synchronous communication message in the first modality based at least in part on the second asynchronous communication message in the second modality. The method may also include providing (210) for display, using the one or more computing devices, to the first user device, the second synchronous message in the first modality. The method may further include providing (212) for display, using the one or more computing devices, to the second user device, the first asynchronous message in the second modality.

As discussed above, one or more of users 46, 48, 50, 52 may access computer 12 and communication process 10 through network 14 or secondary network 18. For example, and for illustrative purposes only, assume that user 46 (i.e., the user of personal computer 38) wishes to use communication process 10. User 46 may access communication process 10 through client application 22 associated with personal computer 38. In this way, communication process 10 may operate as a standalone application or alternatively as an applet or plug-in operating within a separate program such as server application 20. In some embodiments, server application 20 may include a social networking application such as, but not limited to, GOOGLE+, FACEBOOK, MYSPACE, LINKEDIN, TWITTER, etc. Although, this particular example focuses upon user 46 and personal computer 38 it should be noted that this disclosure is not meant to be limited to this particular example as laptop computer 40, smart phone 42, notebook computer 44, etc., may also be used to access and/or render some or all of the embodiments of communication process 10 described herein.

Figure 3:
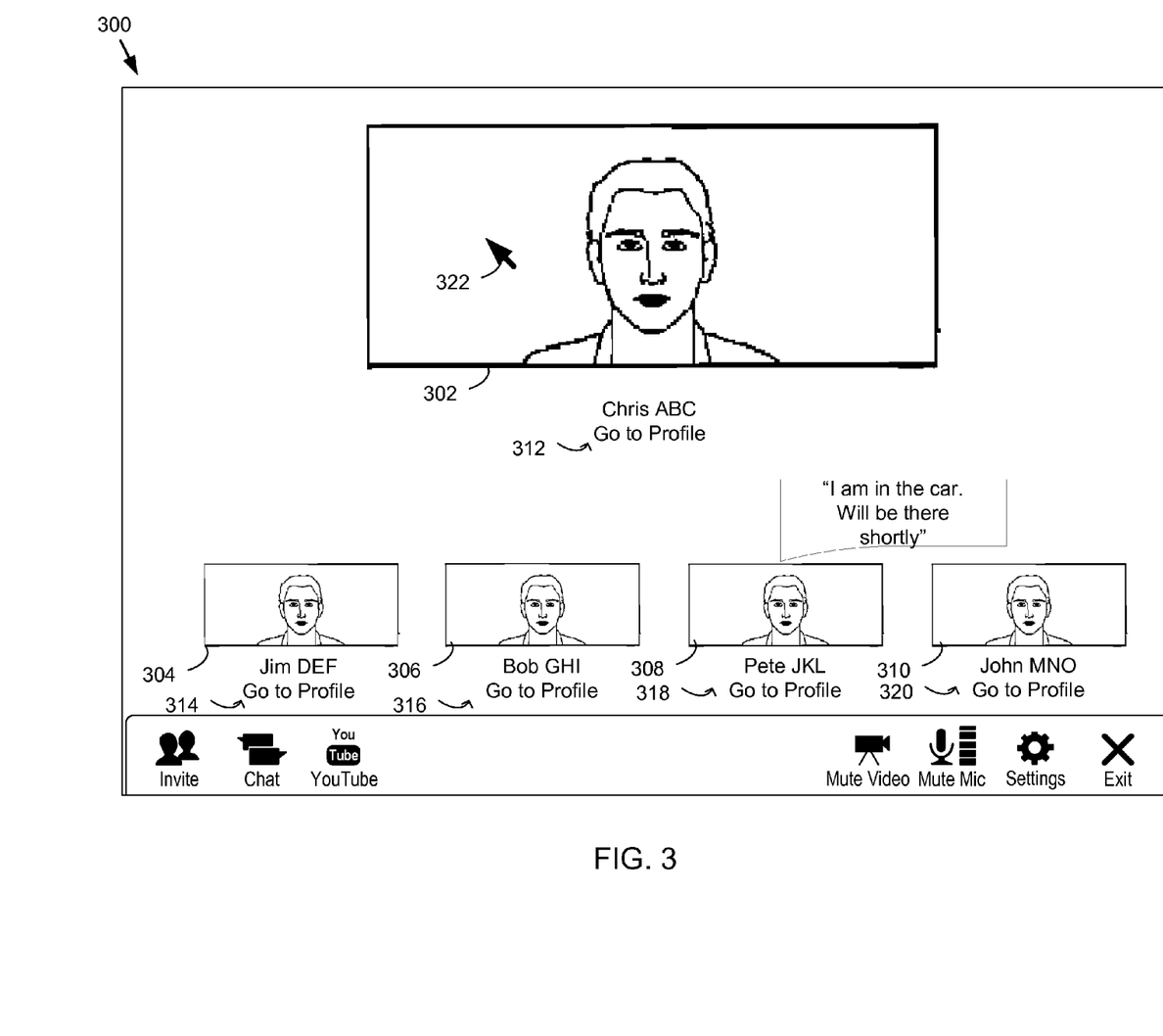
FIG. 3 is a diagrammatic view of an interface rendered by the method for providing multi-modal asynchronous communication of FIG. 1 in accordance with an embodiment of the present disclosure.

As such, and referring now to FIG. 3, when user 46 accesses server application 20 (e.g. GOOGLE+) via client application 22 interface 300 may be rendered at personal computer 38. Interface 300 may include one or more participant interfaces (e.g. 302, 304, 306, 308, 310) each of which may be configured to display video, text, audio, and/or static avatars associated with a participant of an electronic communication session. For example, participant interface 302 may display video of Chris ABC, participant interface 304 may display video of Jim DEF, participant screen 306 may display video of Bob GHI, participant interface 308 may display a static avatar of Pete JKL, and participant interface 310 may display video of John MNO. In some embodiments, the participants' interfaces may be displayed in the order in which they entered the online video group discussion. Although, five participant interfaces are shown in this particular example it should be noted that any number may be displayed without departing from the scope of the present disclosure.

In some embodiments, each participant interface may have participant identification information associated therewith. For example, participant interface 302 may have identification information 312 rendered, in this case identifying the participant as Chris ABC. Similarly, participant interfaces 304, 306, 308, and 310 may each include corresponding identification information 314, 316, 318, and 320. As shown in FIG. 3, the identification information may include at least one of a participant's name and/or a link to a webpage associated with a participant (e.g., "Go to Profile"). Some or all of the identification information may or may not be accessible to the various participants of online video group discussion as is discussed in further detail hereinbelow.

As discussed above, communication process 10 may include receiving (202), using one or more computing devices, a first synchronous communication message in a first modality from a first user device. For the purposes of this disclosure, the phrase "synchronous communication" may refer to its ordinary meaning, as well as to one or more of text, voice or video-based, and instant messaging communication. For example, and as shown in FIG. 3, communication process may receive a first synchronous communication message from user 46 via personal computer 38 (i.e., Chris ABC). In this particular example, Chris ABC is participating in the electronic communication session by providing a live video feed via participant interface 302 (e.g. using a webcam or any other suitable device). For the purposes of this disclosure, the term "modality" may refer to its ordinary meaning, as well as to the type of communication message being transmitted (e.g. video, text, voice, etc.).

Communication process 10 may further include generating (204), using the one or more computing devices, a first asynchronous communication message in a second modality, based at least in part on the first synchronous communication message in the first modality, wherein the first modality differs from the second modality. For the purposes of this disclosure, the phrase "asynchronous communication" may refer to its ordinary meaning, as well as to one or more of text-based, email, discussion board, and blogging forms of communication. In this particular example, communication process 10 may receive the video feed from Chris ABC and may convert the first synchronous communication message from Chris ABC in order to generate a first asynchronous communication message in a second modality, in this example, a text message. This may occur, for example, at server computing device 12. Accordingly, communication process 10 may include text to speech and speech to text conversion capability as is known in the art. The converted message may be provided to other participants in the electronic communication session as is discussed in further detail below.

Figure 5:
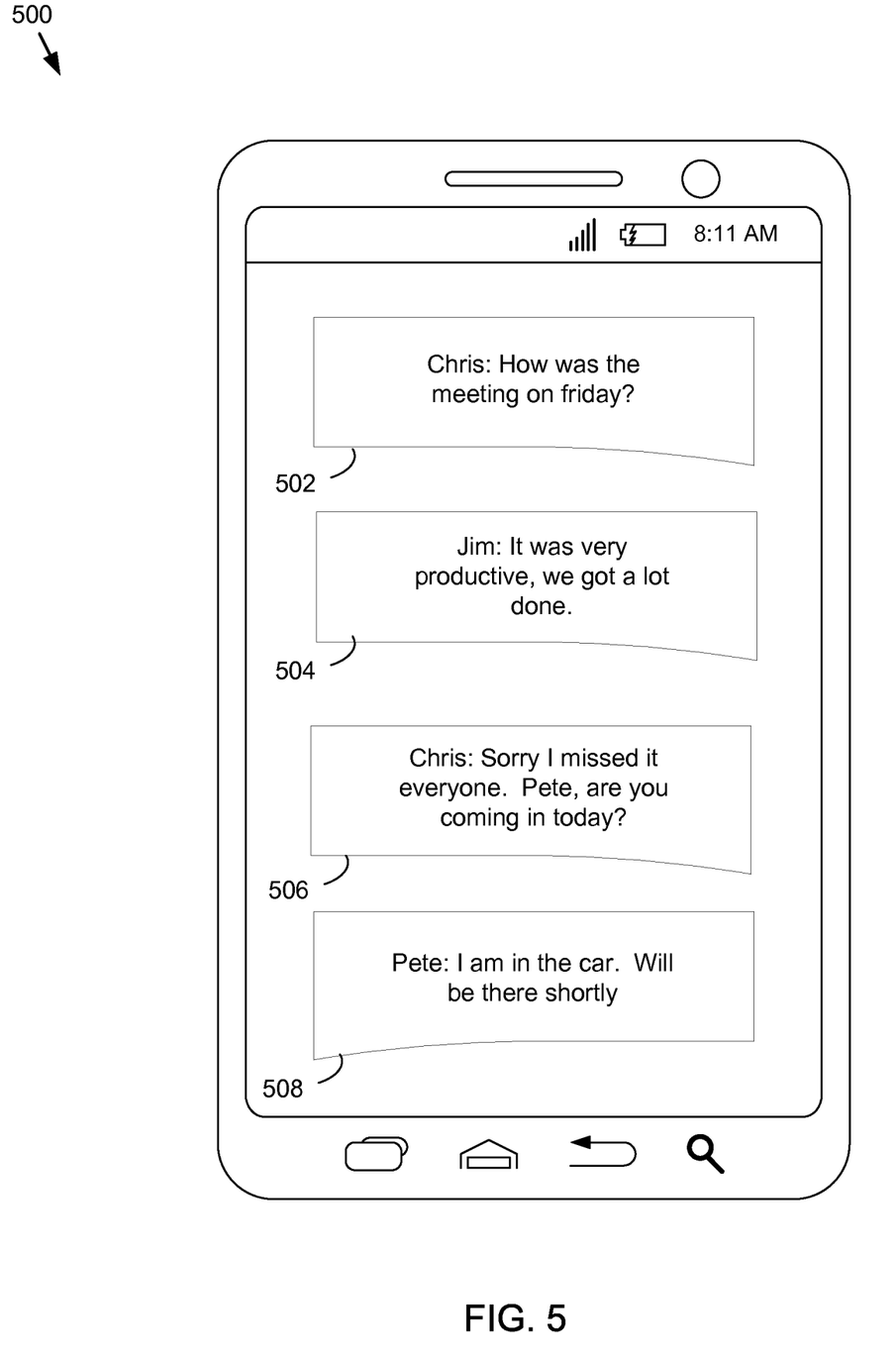
FIG. 5 is a diagrammatic view of a mobile device interface rendered by the method for providing multi-modal asynchronous communication of FIG. 1 in accordance with an embodiment of the present disclosure.

Communication process 10 may further include receiving (206), using the using one or more computing devices, a second asynchronous communication message in the second modality from a second user device. In this particular example, Pete JKL may be participating in the electronic communication session using his mobile device, e.g., while commuting into work (e.g. mobile device 42 shown in FIG. 1, or mobile device 500 shown in FIG. 5). As is shown in FIG. 5, Pete JKL may also receive text messages 502, 504, and 506 from the other participants of the electronic communication session, in this case, text messages corresponding to the video feeds of Chris ABC and Jim DEF. A participant may also create one or more messages using their mobile device, as is known in the art. The generated message (e.g. second asynchronous communication message 508) may be transmitted to one or more computing devices (e.g. server computing device 12), which may receive the second asynchronous message from mobile device 42 or mobile device 500. In FIG. 5, the second asynchronous message may be Pete's "I am in the car. Will be there shortly" text message.

Figure 4:
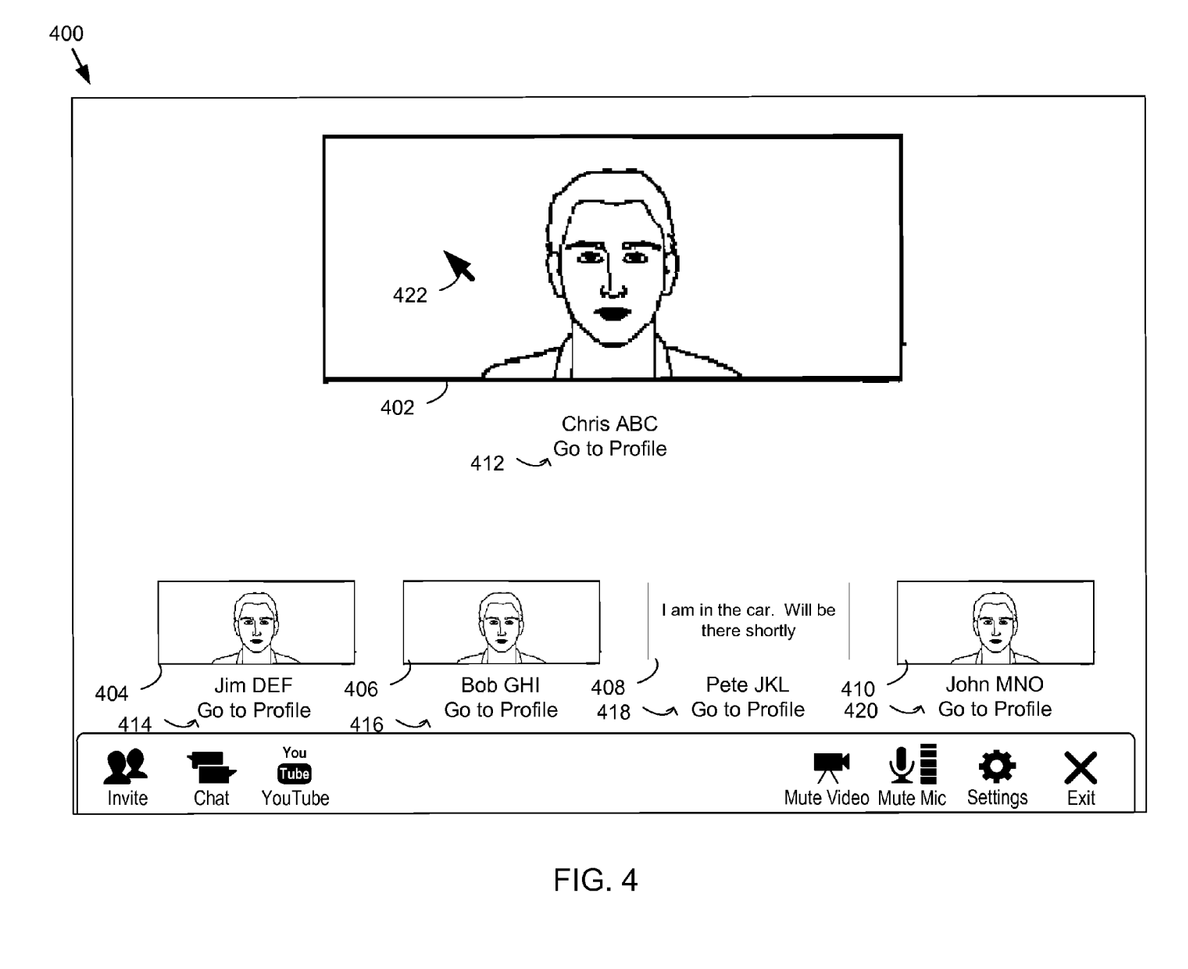
FIG. 4 is a diagrammatic view of an interface rendered by the method for providing multi-modal asynchronous communication of FIG. 1 in accordance with an embodiment of the present disclosure.

Communication process 10 may further include generating (208), using the one or more computing devices, a second synchronous communication message in the first modality based at least in part on the second asynchronous communication message in the second modality. In this example, server computing device 12 may receive Pete's text message and may convert the text message to a synchronous communication message. For example, in FIG. 3, Pete's text message has been converted to an audio message, which may be heard by the other participants of electronic communication session 300. Additionally and/or alternatively, Pete's text message may be displayed as text to the other participants of electronic communication session as is shown in FIG. 4.

Accordingly, communication process 10 may further include providing (210) for display, using the one or more computing devices, to the first user device, the second synchronous message in the first modality. For example, the audio message associated with interface 308 and/or the text message associated with interface 408 may be provided to user 46 via personal computer 38 (i.e., Chris ABC). Additionally and/or alternatively, communication process to may provide (212) for display, using the one or more computing devices, to the second user device, the first asynchronous message in the second modality. For example, text message 502 corresponding to the transcript of the video feed from Chris ABC. In some embodiments, providing for display may be modality-specific. For example, providing for display in the video context may include providing an avatar that speaks, or provides audio of, the text of a chat message that is received. Accordingly, communication process 10 may further include transmitting instructions configured to generate a display of any of the messages described herein. For example, instructions may be transmitted from server computing device 12 to any of user devices 38, 40, 42, 44, 500, etc.

In some embodiments, some or all of the user devices described herein may be electronically coupled to an electronic communication session. For example, the electronic communication session may be server application 20 running on server computing device 12. In this way, user devices, 38, 40, 42, 44, 500 may communicate with server application 20 via one or more networks, for example, network 14, 18, etc.

The present disclosure is not intended to be limited to the example provided above as any number of modalities and combinations of modalities may be used without departing from the scope of the present disclosure. Some modalities may include, but are not limited to, video-based, audio-based, text-based and hybrid modalities.

Additionally and/or alternatively, any number of participants may be included within the electronic communication session. And some or all of the participants may be participating in the session using any suitable mode of communication. Accordingly, multiple synchronous and asynchronous communication messages may be transmitted of any modality type and any number of modality conversions may occur during a particular electronic communication session.

As discussed herein, communication process 10 may convert messages of one particular type to a message of another type. For example, video to audio, video to text, audio to text, text to video, text to audio, synchronous to asynchronous, asynchronous to synchronous, etc. Accordingly, communication process may also be configured to transmit one or more instructions configured to output the converted message at the electronic communication session (e.g. at one or more of user devices 38, 40, 42, 44, 500).

In some embodiments, communication process 10 may be configured to store some or all of the messages sent or received during the electronic communication session. For example, the synchronous communication messages, the asynchronous communication messages, audio, video, text, etc. Accordingly, for all of these participants, a record now exists of the history of the electronic communication session, both the spoken and typed portions of it. Thus, if one of the participants (or a supposed participant) was busy during the electronic communication session, they may catch up on what they missed and then jump back in. In this way, if no one was "live"—a participant could just read the stored backlog and post an update in an IRC like fashion.

Example Additional Embodiments

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
during a communications session, receiving, using one or more computing devices, a first synchronous communication message in a first modality from a first user device coupled to the communications session, wherein the first modality is voice or video;
during the communications session, generating for the communications session, using the one or more computing devices, a first asynchronous communication message in a second modality, wherein the second modality is text, by converting the first synchronous communication message into the first asynchronous communication message, such that a first voice or video message is converted into a first text message;
during the communications session, sending, by the one or more computing devices, to a second user device coupled to the communications session, the first text message;
during the communications session, receiving, using the one or more computing devices, a second asynchronous communication message in the second modality, the second asynchronous communication message comprising a second text message, from the second user device;
during the communications session, generating for the communications session, using the one or more computing devices, a second synchronous communication message in the first modality, the second synchronous communication message comprising a second voice or video message, by converting the second text message to the second voice or video message;
during the communications session, providing for display, using the one or more computing devices, to the first user device, the second voice or video message; and
during the communications session, storing the synchronous and asynchronous messages to create a record of history of the communications session comprising text messages and voice or video messages from the communications session.

2. The computer-implemented method of claim 1, wherein the first modality is video conferencing.

3. The computer-implemented method of claim 1, wherein the second modality is SMS or MMS text messaging.

4. The computer-implemented method of claim 1, further comprising:
receiving, at the one or more computing devices, at least one of a third synchronous communication message and a third asynchronous communication message.

5. The computer-implemented method of claim 1, further comprising:
transmitting, by the one or more computing devices, to a third user device, instructions configured to generate a display of at least one of the first synchronous communication message, the first asynchronous communication message, the second synchronous communication message and the second asynchronous communication message.

6. The computer-implemented method of claim 1, further comprising:
converting, at the one or more computing devices, the second asynchronous communication message to an audio message.

7. The computer-implemented method of claim 6, further comprising:
transmitting, by the one or more computing devices, one or more instructions configured to output the audio message to a third user device coupled to the communications session.

8. The computer-implemented method of claim 1, further comprising:

converting, using voice recognition at the one or more computing devices, at least one of a voice-based synchronous communication message and an audio-based synchronous communication message to a text-based message.

9. The computer-implemented method of claim 8, wherein the text-based message is included within a display associated with the communications session.

10. The computer-implemented method of claim 1, further comprising:
transmitting, by the computing device, one or more instructions configured to display a static avatar corresponding to at least one participant of the communications session.

11. The computer-implemented method of claim 1, wherein the communications session is at least one of a web-based session configured to allow video-chat and a text messaging session.

12. The method of claim 1, further comprising providing the stored record of the history of the communications session to a participant in text format so that the participant can read the history of the communications session.

13. A non-transitory processor readable storage medium having a plurality of instructions stored thereon that when executed by a processor, cause the processor to perform operations comprising:
during a communications session, receiving, using one or more computing devices, a first synchronous communication message in a first modality from a first user device coupled to the communications session, wherein the first modality is voice or video;
during the communications session, generating for the communications session, using the one or more computing devices, a first asynchronous communication message in a second modality, wherein the second modality is text, by converting the first synchronous communication message into a first asynchronous communication message, such that a first voice or video message is converted into a first text message;
during the communications session, communicating, using the one or more computing devices, to a second user device coupled to the communications session, the first text message;
during the communications session, receiving, using the one or more computing devices, a second asynchronous communication message in the second modality from the second user device, the second asynchronous communication message comprising a second text message;
during the communications session, generating for the communications session, using the one or more computing devices, a second synchronous communication message in the first modality, the second synchronous communication message comprising a second voice or video message, by converting the second text message to the second voice or video message;
during the communications session, communicating, using the one or more computing devices, to the first user device, the second voice or video message; and
during the communications session, storing the synchronous and asynchronous messages to create a record of history of the communications session comprising text messages and voice or video messages from the communications session.

14. The non-transitory processor readable storage medium of claim 13, wherein the first modality is video conferencing.

15. The non-transitory processor readable storage medium of claim 13, wherein the second modality is SMS or MMS text messaging.

16. The non-transitory processor readable storage medium of claim 13, further comprising:
receiving, at the one or more computing devices, at least one of a third synchronous communication message and a third asynchronous communication message.

17. The non-transitory processor readable storage medium of claim 13, further comprising:
transmitting, at the computing device, to a third user device, instructions configured to generate a display of at least one of synchronous communication message, the asynchronous communication message, the second synchronous communication message and the second asynchronous communication message.

18. The non-transitory processor readable storage medium of claim 13, further comprising providing the stored record of the history of the communications session to a participant in text format so that the participant can read the history of the communications session.

19. A computing system, comprising:
one or more processors configured to receive during a communications session a first synchronous communication message in a first modality from a first user device coupled to the communications session, wherein the first modality is voice or video, the one or more processors further configured to generate for the communications session, during the communications session a first asynchronous communication message in a second modality, wherein the second modality is text, by converting the first synchronous communication message in the first modality to the first asynchronous communication message in the second modality such that a first voice or video message is converted into a first text message, the one or more processors further configured to receive during the communications session a second asynchronous communication message in the second modality from a second user device coupled to the communications session, the second asynchronous communication message comprising a second text message, the one or more processors further configured to generate during the communications session a second synchronous communication message in the first modality by converting the second text message to a second voice or video message, the one or more processors further configured to communicate during the communications session to the first user device, the second synchronous message in the first modality, the one or more processors further configured to communicate to the second user device, the first asynchronous message in the second modality, the one or more processors further configured to store during the communications session the synchronous and asynchronous messages to create a record of history of the communications session comprising text messages and voice or video messages from the communications session.

20. The computing system of claim 19, wherein the one or more processors are further configured to convert the asynchronous communication message to an audio message.

21. The computing system of claim 20, wherein the one or more processors are further configured to output the audio message to a third user device coupled to the communications session.

22. The computing system of claim 19, wherein the one or more processors are further configured to convert at least one of a voice-based synchronous communication message and an audio-based synchronous communication message to a text-based message using voice recognition.

23. The computing system of claim 22, wherein the text-based message is included within a display associated with the communications session.

24. The computing system of claim 19, wherein the one or more processors are further configured to provide the stored record of the history of the communications session to a participant in text format so that the participant can read the history of the communications session.

* * * * *